Figure 1:
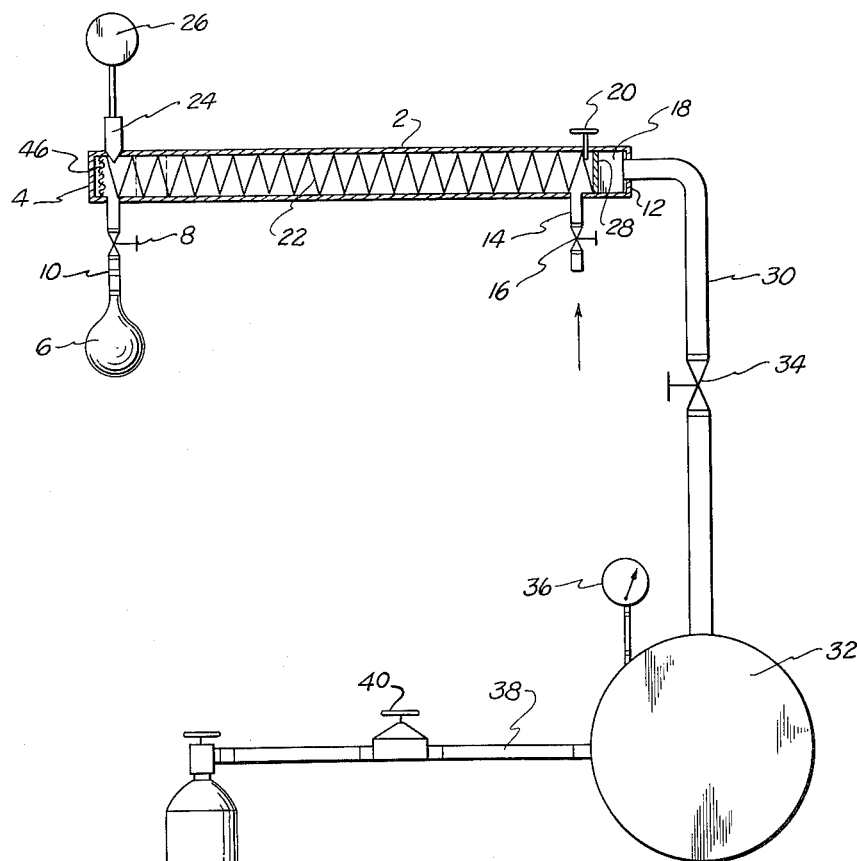

March 27, 1962 G. STAMPE ETAL 3,026,711
FLAMMABLE GAS DETECTION
Filed June 17, 1957

INVENTORS
Gerhard Stampe
Karl F. Mollering
Karl Grosskopf

BY Bailey, Stephens & Huettig
ATTORNEYS 3,026,711
FLAMMABLE GAS DETECTION
Gerhard Stampe, Karl F. Mollering, and Karl Grosskopf, Lubeck, Germany, assignors to Otto Heinrich Drager, Lubeck, Germany
Filed June 17, 1957, Ser. No. 666,052
Claims priority, application Germany June 23, 1956
3 Claims. (Cl. 73—23)

This invention relates to a method and apparatus for detecting the presence of gases in the air, and in particular, for the detection of flammable gases, such as methane.

Several processes are known for detecting the presence of methane in the air, which are especially important for determining the presence of mine damp. Different principles are involved in these methods. One is an optical process which detects methane by means of the refractive index determination. Another is based upon the measurement of the inner friction and the escape speed, respectively, of the gas. Such processes require elaborate apparatuses.

Detecting devices are also known in which the gas is passed through hot glowing wires in order to burn the methane. Again, devices exist for determining the heat conductivity of the air-gas mixture by measuring the radiation of a heated wire.

The objects of this invention are to produce a process and apparatus for determining the presence of flammable gases, such as methane, in the air by means of a simple apparatus which avoids the disadvantages of using the elaborate devices formerly used.

In general, these objects are obtained by a sudden compression of a certain quantity of the gas-air mixture and then measuring the heat of combustion of the flammable gas in the gas-air mixture. This is a very simple procedure and does not require a complicated apparatus and eliminates the need for heated glowing wires with their attendant disadvantages. By using a sudden and high compression of the air-gas mixture in a confined space, a high enough temperature can be created so that even such slowly flammable gases such as methane are ignited and burned.

Several means can be used for determining the heat of the compressed gas. In one form, the increased volume resulting from combustion is measured to indicate the quantity of flammable gas. Again, the increase in temperature resulting from compression and combustion can be compared with the temperature produced by compression alone of the air-gas mixture, and the amount of flammable gas thus determined. In this case, the additional heat produced by a flammable gas, such as methane, can be easily measured.

In another form, the products of combustion of the air-gas mixture can be used for determining the amount of flammable gas. The compressed gases are passed through test tubes while being more or less expanded for determining the products of combustion. The presence of the flammable gases are identified as oxidized products produced by decomposition. Methane is very inactive and cannot be decomposed by simple chemical means at normal temperatures, but oxidized products such as formaldehyde, CO, and $CO_2$, can be identified by a simple chemical reaction.

If the quantity of flammable gas such as methane mixed with air is not enough to reach an ignition point, the process can be performed by the addition of a certain amount of a flammable gas, preferably pentane, to the air-gas mixture before compressing the same. By such addition, an ignitable air-gas mixture is formed. The heat produced by igniting a mixture of air and pentane is known, and then has to be taken into consideration in determining the heat produced by the methane in the air-gas mixture. A feature of the invention lies in that the added amount of flammable gas, such as pentane, can be so small that the mixture of air and added gas alone will not ignite in the absence of other flammable gases. Therefore, the quantity of added gas is kept under the explosion point. If the tested air-gas mixture contains other flammable gases, such as methane, the ignition point is reached.

One or more catalysts can be employed for supporting the combustion of the air-gas mixture and thus a reaction is insured. Furthermore, the use of catalysts enables the combustion to be directed into any desired form.

Different means can be used for compressing the air-gas mixture. A simple means is composed of a container filled with the air-gas mixture and piston means for compressing the gas. Another means is composed of a container for holding the air-gas mixture, and means for injecting highly compressed oxygen or oxygen rich gas into the container.

Different form of apparatus can be used. A simple form consists of a cylinder for holding the air-gas mixture and a piston in the cylinder which can be moved suddenly by manual or other means for compressing the gas in the cylinder. The piston is held in starting position by an arresting device such as a catch, and the piston is urged to the starting position by means of a coil spring. This coil spring is lightly tensioned so that the piston can be quickly moved in the cylinder by an imposed pressure after the piston is released from the catch. A tube having a length of about 50 to 100 cm. and an inner diameter of from about 3 to 20 mm., preferably 5 to 10 mm., is used as the pressure-tight cylinder. This tube is filled with the air-gas mixture, such as an air-methane mixture. At one end of the tube is a cut-off valve communicating with an air drawing device, such as a rubber suction bulb. By means of the suction bulb, the air-gas mixture is drawn into the tube until it is filled. Within the tube is a piston which is held in place on the opposite open end of the tube by means of a catch, the piston being initially maintained in this position by means of a coil compression spring. This spring can be used for suddenly moving the piston toward the opposite end of the tube after the catch is released, and thereby compressing the gas-air mixture in a fraction of a second.

The pressure produced can be up to 200 atmospheres or, for example, from 50 to 100 atmospheres. Instead of using the expansion of the spring for moving the piston, manual means can be employed for this purpose. A pressure of about 200 atmospheres can thus be produced. The high temperature created by the compression ignites the flammable gas. Consequently, the heat of combustion can be measured and the content of combustion products thus be determined.

Highly compressed gases can be used for moving the piston rather than using the compressed spring or manual means. A special form of apparatus is provided for this purpose. The cylinder for holding the gas to be tested is connected with a container holding highly compressed gas. The pipe connecting the cylinder to the container includes a quickly working valve. The container is further connected through a reducing valve to a supply tank holding highly compressed gases. When the quickly operating valve is opened between the container and the cylinder, the piston is subjected to a high pressure of, for example, 100 atmospheres. The piston is thus forced through the cylinder and compresses the gas to be tested to the same pressure.

It is desirable to insulate the piston against heat loss so that the heat given up in the expansion of the gases is not transferred through the piston. Consequently, the piston has a central heat insulating layer or the faces of the piston are insulated so as to prevent the transfer of heat.

In another form of the invention, the cylinder is connected through a quickly operating valve to a container holding highly compressed oxygen or oxygen rich gases and the container, in turn, is connected through a reducing valve to a storage or supply tank. When the quickly operating valve is opened, the pressure in the testing cylinder is suddenly increased. This increase in pressure heats the air-gas mixture to be tested up to the combustion point.

The container holding the highly compressed gases should be larger than the testing cylinder so that such a large volume of highly compressed gas exists which has only a little pressure drop when passed to the testing cylinder. For example, if the container has about ten times the volume of the testing cylinder and is filled with oxygen under a pressure of 100 atmospheres, the pressure drop to the testing cylinder is down to 90 atmospheres.

For measuring the heat of combustion, a thermocouple can be fitted in the compression chamber of the testing cylinder, that is in the portion of the cylinder not occupied by the piston at the end of the compression stroke. The temperature of the thermocouple can be indicated by known means. By a comparison of the compression temperature of air alone with the compression temperature of an air-gas mixture, the heat content of flammable gas will be measured.

A further form of the invention employs a color indicator for showing the temperature in the compression chamber. Heat sensitive colors are used which change colors at certain temperatures, and the change in color tells the temperature encountered.

Another form of the invention has a pipe connected to the compression chamber and a measuring device coupled to the pipe for indicating the quantity of combustion products produced by the air-gas mixture. In a simple construction, the compression chamber is connected through a valve with a fitting for attaching a test tube. The test tube identifies the quantity of the combustion products produced as, for example, formaldehyde, CO, or $CO_2$.

The measuring tube can also be made of transparent material.

Figure 2:
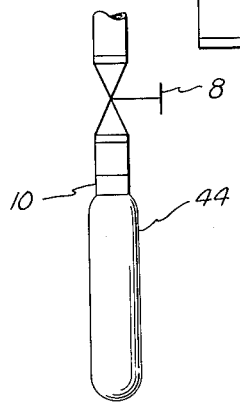

The means by which the objects of the invention are obtained are described more fully with reference to the following schematic drawings, in which:

FIGURE 1 is a schematic outline partly in section showing the testing device; and FIGURE 2 is a detail of a modification showing the use of a test tube.

The testing cylinder 2 is closed at one end 4. Adjacent end 4 is a flexible suction bulb 6 connected to cylinder 2 through cut-off valve 8. The bulb 6 is removably secured to the valve pipe by means of a fitting 10. Adjacent the other end 12 of the cylinder is an air intake pipe 14 containing cut-off valve 16. Mounted within the cylinder is a free piston 18 which is adapted to be held adjacent end 12 by a catch 20. The piston is urged to its position against end 12 by means of a lightly tensioned coil spring 22. Adjacent end 4 is a thermocouple 24 entering into the portion of the cylinder 2 functioning as the compression chamber. Indicator 26 shows the temperature in the combustion chamber.

Piston 18 can be constructed of heat insulating material or the surface of one face can be given a lining 28 of insulating material.

A pipe 30 connects end 12 of cylinder 2 to a gas container 32, a quickly operated valve 34 being connected in pipe 30. The pressure in container 32 is shown by indicator 36. The container 32 is also connected through pipe 38, including a reducing valve 40, to a high pressure tank 42.

In the modification of FIGURE 2, after cylinder 2 has been filled with gas, the suction bulb 6 is replaced through an appropriate fitting by a test tube 44.

Catalytic material 46 can be placed in the compression chamber end of cylinder 2.

In the operation of FIGURE 1, the piston 18 is initially urged to the right by spring 22 and held in place by catch 20.

Valves 8 and 16 are open and suction bulb 6 actuated to draw an air-gas mixture into cylinder 2 and filling the same. Valves 8 and 16 are then closed. Reducing valve 40 is open filling container 32 with a gas having a compression of about 150 atmospheres. The quickly operating valve 34 is opened so that the gas pressure applied to piston 18, upon the release of catch 20, suddenly moves the piston to the left where it reaches its dashed-line position and compresses the air-gas mixture which is self-ignitable. The temperature of the combustion is measured by a thermocouple 24 and shown on indicator 26. Indicator 26 is calibrated so that it shows the temperature difference between the mere heat of compression and the heat of combustion. Thereby the combustion heat alone is ascertained, and indicated directly into the percent of methane in the air-gas mixture.

The presence of the catalyst 46 in the compression chamber will insure the combustion of certain air-gas mixtures.

As shown in FIGURE 2, the test tube 44 replaces the suction bulb 6 for indicating the presence of carbonic acid and the like. Following the combustion of the gases, valve 8 is opened and the combustion gases passed at a controlled speed into the test tube. The percent of methane contained in the air-gas mixture can also be directly calibrated on tube 44.

Piston 18, in another operation, can be omitted so that the gas entering cylinder 2 through pipe 30 will compress the air-gas mixture within cylinder 2 with a further mixing of the gases. Oxygen is preferably used as the pressure gas in container 32 in order to secure a faultless combustion of the air-gas mixture being tested.

Having now described the means by which the objects of the invention are obtained,

We claim:

1. A method of determining the unknown quantitative presence of a hydrocarbon gas, such as methane, in an air-gas mixture, comprising adding sufficient and known quantities of a flammable gas to said air-gas mixture to ensure combustion of said mixture, suddenly applying oxygen at a pressure of at least 90 atmospheres to said mixture to compress said mixture to its self-igniting temperature and producing a combustion of said mixture, collecting the products of combustion, and indicating the chemical constituents of said products of combustion in terms of said hydrocarbon gas.

2. A process as in claim 1 in which the quantity of added flammable gas is less than that required for the ignition of a mixture of air and added gas alone.

3. A process as in claim 1, further comprising compressing and igniting said air-gas mixture in the presence of a catalyst.

References Cited in the file of this patent

UNITED STATES PATENTS

| | | |
|---|---|---|
| 2,679,753 | Flamm | June 1, 1954 |
| 2,825,226 | Daley et al. | Mar. 4, 1958 |
| 2,826,073 | Huyck et al. | Mar. 11, 1958 |

OTHER REFERENCES

Article, Ignition of Gases by Sudden Compression by Tizard et al. in Philosophical Magazine, vol. 1, 1926, May, page 1094. (Copy in Patent Office Library.)

National Bureau of Standards, Technical News Bulletin, vol. 37, No. 8, Aug. 1953, pages 113–115. (Copy in 73–35).